3,453,247
AMORPHOUS, VULCANIZABLE TERPOLYMERS OF ETHYLENE, ALIPHATIC ALPHA-OLEFINS, AND ALKENYLMETHYLENCYCLOALKANES OR -CYCLOALKENES
Guido Sartori, Nazzareno Cameli, and Alberto Valvassori, Milan, Italy, assignors to Montecatini Edison S.p.A., a corporation of Italy
No Drawing. Filed Feb. 17, 1965, Ser. No. 433,505
Claims priority, application Italy, Feb. 21, 1964, 3,909/64
Int. Cl. C08f 19/00, 27/02
U.S. Cl. 260—79.5          8 Claims

ABSTRACT OF THE DISCLOSURE

There are disclosed linear, high molecular weight, amorphous, unsaturated copolymers of one or more alkenyl-methylen-cycloalkanes and alkenyl-methylen-cycloalkenes with one or more monomers selected from ethylene and higher alpha-olefins such as propylene and butene-1. The copolymers consist of macromolecules containing unsaturations and made up of units of each of the monomers used, and are vulcanizable to elastomers. The copolymers are obtained by copolymerizing mixtures of the monomers in contact with catalysts prepared from vanadium compounds and organometallic compounds or hydrides of aluminum or beryllium.

---

The present invention relates to a new class of substantially linear, amorphous, vulcanizable, high molecular weight olefin copolymers and to a process for preparing them by the use of catalysts acting with a co-ordinated anionic mechanism. Our group described earlier the preparation of amorphous, vulcanizable copolymers obtained by the copolymerization of ethylene and/or aliphatic alpha-olefins with conjugated, non-conjugated, linear or cyclic dienes or polyenes in which copolymers each monomeric unit deriving from the polymerization of dienes or polyenes still retains one or, respectively, more than one free unsaturation. As was disclosed, those copolymers can be vulcanized with sulfur-containing mixes, such as those commonly used for the vulcanization of unsaturated rubbers, and thus transformed into products having good elastomeric characteristics.

It has now been found according to the present invention that by using particular catalysts acting with a mechanism of anionic coordinate type it is possible to prepare a new class of amorphous, unsaturated copolymers, not previously described and capable of being vulcanized to elastomers having good mechanical characteristics.

More particularly, we have found that, by using catalysts prepared from vanadium compounds and organometallic compounds or hydrides of aluminum or beryllium, it is possible to obtain linear, high molecular weight, amorphous, unsaturated copolymers of one or more monomers selected from alkenyl-methylen-cycloalkanes and alkenyl-methylen-cycloalkenes, with one or more monomers selected from ethylene and aliphatic alpha-olefins comprised in the general formula R—CH=$CH_2$ in which R is an alkyl group containing from 1 to 6 carbon atoms, which copolymers consist of macromolecules containing unsaturations and consisting of monomeric units deriving from each of monomers used.

In practice, catalytic systems in which at least one of the components contains at least one halogen atom are used to obtain the copolymers of this invention.

Since it could have been expected that the presence of halogen in the catalysts could promote a copolymerization of the cationic type, with breaking of the double methylene bond and the production of homopolymers or of tridimensional cross-linked polymers insoluble in organic solvents and therefore wholly useless, it is surprising that insoluble tridimensional cross-linked polymers are not formed and only one of the unsaturations of the alkenyl-methylen-cycloalkane or cycloalkene is involved in the copolymerization reaction, the other unsaturation or unsaturations thereof remaining free and providing, along the copolymer chain, respectively, reactive sites for subsequent reaction, for instance for vulcanization.

In fact, infrared spectrographic examination of the copolymers of this invention shows the presence of bands attributable to the double methylenic bond (bands at 6.0 and 11.45μ).

Illustrative examples of alkenyl-methylen-cycloalkanes or -cycloalkenes that can be used to obtain the copolymers of the present invention include: 3-vinyl-6-methylene-1, 2,3,4,5,6,7,8-octahydronaphthalene, 1-vinyl-3-methylencyclopentane
vinylmethylencyclohexanes
allylmethylencyclo-octenes
methallyl-methylencycloheptenes
allyl-methylendicyclo[2,2,1]-heptanes
methallylmethylendicyclo[2,2,1]-heptenes.

As is shown, these monomers are easily prepared. For instance, the 3-vinyl-6-methylene-1,2,3,4,5,6,7,8-octahydronaphthalene can be obtained from butadiene and allene (Benson, J. A. Chem. Soc. 81, 4247 (1959)).

The olefins which can be used for the preparation of copolymers according to the present invention are selected from ethylene and aliphatic alpha-olefins having the general formula R—CH=$CH_2$ in which R is an alkyl group containing from 1 to 6 carbon atoms, more particularly propylene and butene-1.

By copolymerizing a mixture of the above-mentioned monomers, such as for instance a mixture of ethylene, propylene and/or butene-1 and 3-vinyl-6-methylen-1,2,3, 4,5,6,7,8-octahydronaphthalene, there is obtained a crude (total) copolymerization product consisting of macromolecules in each of which monomeric units of ethylene, of propylene and/or butene-1, and of vinylmethylenoctahydronaphthalene are distributed at random.

Each of the monomeric units resulting from the copolymerization of the alkenyl-methylen-cycloalkene or cycloalkane still contains at least one free unsaturation.

These unsaturations are reactive points for subsequent reactions carried out on the copolymer, and make it possible for instance, to vulcanize the copolymer with mixes of the type commonly used for the vulcanization of unsaturated rubbers. Also, the double bonds present in the macromolecules can, for instance, by oxidation with ozone, yield polar groups, such as e.g. carboxylic groups, which in turn can be reactive sites for subsequent reactions and can be utilized for improving the adhesivity of the polymer.

The double bonds can also be utilized for addition reactions with metal hydrides, e.g. LiH, $NaBH_4$,

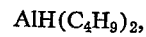

etc.

The metal-to-carbon bonds thus formed can also be used for further reactions.

The copolymers of the present invention can be defined as having a linear structure, that is as being substantially free of long branchings. This is demonstrated by the fact that these new copolymers have properties, such as, more particularly, a viscous behavior, practically identical with those of known copolymers, e.g. linear amorphous ethylene/higher alpha-olefin copolymers.

The new copolymers have a molecular weight higher than 20,000, determined viscosimetrically. In fact these copolymers have an intrinsic viscosity, determined in tetrahydronaphthalene at 135° C. or in toluene at 30° C., higher than 0.5.

These copolymers can further be defined as being homogeneous. This is demonstrated, for instance in the case of the terpolymer ethylene/propylene/3-vinyl-6-methylen-1,2,3,4,5,6,7,8-octahydronaphthalene, by the ease with which the copolymer is converted to well-vulcanized products by the techniques generally used in the vulcanization of the unsaturated rubbers, preferably in the vulcanization of the unsaturated rubbers having a low unsaturation content, such as butyl rubber. The readiness with which the copolymers are vulcanized also demonstrates that the unsaturations are well distributed along the copolymer chain.

The vulcanized product thus obtained are wholly insoluble in the organic solvents, such as aliphatic hydrocarbons, and are swollen only to a limited extent by some aromatic solvents, whereas the new copolymers as such are completely soluble in boiling n-heptane. Moreover the vulcanized rubbers thus obtained from the new copolymers show very good mechanical strength and a very low permanent set at break. More particularly, said rubbers have high reversible elastic elongations and, particularly when reinforcing fillers such as carbon black are employed in the vulcanization mix, also have high tensile strengths. The copolymers per se, i.e., in the non-vulcanized state, have the properties of non-vulcanized elastomers since they have a low initial modulus and a very high elongation at break.

Due to their very good mechanical characteristics, the elastomers obtained by vulcanizing the new copolymers can be used advantageously for the same purposes as natural rubbers and synthetic rubbers in general. For example, these vulcanized copolymers can be used in the preparation of pipes, tire tubes, foils, elastic yarns, gaskets, etc.

The copolymers can be extended or plasticized with hydrocarbon oils. Paraffinic or naphthenic oils are preferably used but aromatic oils can also be used.

The catalytic systems which may be employed in the preparation of the copolymers are highly dispersible, amorphous colloidally dispersible; or wholly soluble in the hydrocarbons which may be employed as copolymerization medium, as for instance, aliphatic, cycloaliphatic or aromatic hydrocarbons or mixtures thereof, and are prepared from organo-metallic compounds or hydrides of aluminum or beryllium and from vanadium compounds.

The organometallic compounds or the hydrides which may be employed in the preparation of the catalyst are preferably selected from the group consisting of beryllium dialkyls, beryllium alkylhalides, beryllium diaryls, aluminum trialkyls, aluminum dialkylmonohalides, aluminum monoalkyldihalides, aluminum alkylsesquihalides, aluminum alkenyls, aluminum alkylenes, aluminum cycloalkyls, aluminum cycloalkyl-alkyls, aluminum aryls, aluminum alkylaryls, aluminum dialkylalkoxides, aluminum alkylalkoxyhalides, aluminum alkylhydrides, aluminum halohydrides, and complexes of the above cited organoaluminum compounds with Lewis base, preferably with weak Lewis bases.

Illustrative examples of the beryllium and aluminum compounds which can be mixed with vanadium compounds to obtain catalysts include: beryllium dimethyl, beryllium methylchloride, beryllium diethyl, beryllium di-n-propyl, beryllium diisopropyl, beryllium di-n-butyl, beryllium di-tert.-butyl, beryllium diphenyl, aluminum triethyl, aluminum triisobutyl, aluminum trihexyl, aluminum diethylmonochloride, aluminum diethylmonoiodide, aluminum diethylmonofluoride, aluminum diisobutylmonochloride, aluminum monoethyldichloride, aluminum ethylsesquichloride, aluminum butenyldiethyl, aluminum isohexenyldiethyl, 2-methyl-1,4-di(diisobutylaluminum)-butane, aluminum tri(cyclopentyl-methyl), aluminum tri(dimethylcyclopentylmethyl), aluminum triphenyl, aluminum tritolyl, aluminum di(cyclopentylmethyl) monochloride, aluminum diphenyl monochloride, aluminum diisobutylmonochloride complexed with anisole, aluminum monochloromonoethylmonoethoxide, aluminum diethylpropoxide, aluminum diethyl amyloxide, aluminum monochloromonopropylmonopropoxide, aluminum monochloromonopropylmonomethoxide, aluminum monochloromonopropylmonoethoxide, aluminum diethyl monohydride, aluminum diisobutylmonohydride, aluminum monoethyldihydride, and aluminum chlorohydrides.

The vanadium compounds mixed with the foregoing aluminum or beryllium compounds to form the desired catalyst systems, are preferably those vanadium compounds which are soluble in hydrocarbons, such as the halides and oxyhalides (e.g. $VCl_4$, $VOCl_3$, $VBr_4$) and compounds wherein at least one of the vanadium valences is saturated by a heteroatom (in particular oxygen or nitrogen) linked to an organic group, such as e.g. vanadium triacetylacetonate and tribenzoylacetonate, vanadyl diacetylacetonate and haloacetylacetonates, vanadyl trialkoxides and haloalkoxides, and tetrahydrofuranates, etherates, aminates, pyridinates and quinolinates of vanadium tri- and tetrachloride and of vanadyl trichloride. Hydrocarbon-insoluble vanadium compounds selected from the organic salts such, as e.g., vanadium triacetate, tribenzoate and tristearate, may also be used.

In practice, and as above stated, at least one of the catalyst-forming components contains at least one halogen atom.

The copolymerization may be carried out at temperatures between —80 and +125° C.

When the catalyst employed is prepared from vanadium triacetylacetonate, vanadyl diacetylacetonate, vanadyl haloacetylacetonates, or in general from a vanadium compound (such as, in addition to those already mentioned, $VCl_4$, or $VOCl_3$) in the presence of aluminum alkylhalides, and in order to obtain high copolymer productions per weight unit of catalyst used, both the catalyst preparation and the copolymerization are carried out at temperatures in the range between 0° C. and —80° C., preferably between —10 and —50° C.

When operating under said conditions, the catalysts display an activity much higher than that of the same catalytic systems prepared at higher temperatures. Moreover, when operating within the above indicated range of low temperatures, the activity of the catalysts remains practically unchanged with time.

When the catalyst employed is prepared from an aluminum alkyl-halide and vanadium triacetylacetonate, vanadyl trialkoxides, or vanadyl haloalkoxides at temperatures comprised between 0° C. and 125° C., it is advantageous, in order to obtain high copolymer yields, to operate in the presence of particular complexing agents selected from ethers, thioethers, tertiary amines or trisubstituted phosphines containing at least one branched alkyl group or an aromatic nucleus.

The complexing agent may be an ether having the formula RYR' in which Y is oxygen or sulphur and R and R' are linear or branched alkyl groups containing from 1 to 14 carbon atoms, at least one of R and R' being a branched alkyl group or an aromatic nucleus.

The complexing agent may be a tertiary amine having the formula:

in which R, R' and R" each represent an alkyl group containing from 1 to 14 carbon atoms, or an aromatic nucleus containing from 6 to 14 carbon atoms, at least one of the R's being an aromatic nucleus.

The complexing agent may also be a tertiary phosphine having the formula:

in which R, R' and R" each represent an alkyl radical containing from 1 to 14 carbon atoms or an aromatic nucleus containing from 6 to 14 carbon atoms, at least one of these R's being an aromatic nucleus.

The amount of complexing agent used is preferably between 0.05 and 1 mole per mole of aluminum alkylhalide.

The activity of the catalysts employed in the herein described process varies with the molar ratio between the compounds employed in the catalyst preparation.

In general, molar ratios between the aluminum or beryllium metallorganic compound or hydride and the vanadium compound of from 0.5:1 to 30:1 are used.

It has been found, however, that if aluminum trialkyls and vanadium halides or oxyhalides are used, catalysts in which the molar ratio of the moles of aluminum trialkyls to the moles of vanadium compound is between 1 and 5, preferably between 2 and 4, are preferred. On the other hand, if the catalyst is prepared from aluminum diethylmonochloride ($Al(C_2H_5)_2Cl$) and vanadium triacetylacetonate ($VAc_3$), the best results are obtained with an $Al(C_2H_5)_2Cl/VAc_3$ molar ratio between 2 and 30, preferably between 4 and 10.

The copolymerization according to the present invention may be carried out in the presence of an aliphatic, cycloaliphatic or aromatic hydrocarbon solvent, such as, e.g., butane, pentane, n-heptane, toluene, xylene, or mixtures thereof.

Halogenated hydrocarbons which are inert to the catalyst, such as e.g. chloroform, trichloroethylene, chlorobenzene, tetrachloroethylene, methylenechloride, etc., can also be used as the liquid copolymerization medium or diluent.

Particularly high copolymerization rates can be obtained by carrying out the copolymerization in the absence of an inert solvent and employing the monomers in the liquid state, that is by subjecting to the copolymerizing conditions a solution of ethylene in the mixture of aliphatic alpha-olefins and of alkenylmethylencycloalkanes (and/or alkenylmethylencycloalkenes), maintained in the liquid state.

In order to obtain copolymers having a high homogeneity of composition, during the copolymerization the ratio between the concentrations of the monomers to be copolymerized, present in the liquid reacting phase, should be kept constant or at least as constant as possible. To this end it may be convenient to carry out the copolymerization continuously by feeding and discharging in a continuous way of mixture of monomers of constant composition and operating with high flow rates.

The composition of the copolymers may be varied within wide limits by varying the composition of the monomer mixture.

For example, amorphous copolymers of alkenylmethylencycloalkanes (and/or alkenylmethylencycloalkenes) with ethylene and propylene, are obtained by maintaining a molar ratio between ethylene and propylene lower than or at most equal to 1:4 in the liquid reacting phase. This corresponds to an ethylene-propylene molar ratio in the gaseous phase, under normal conditions, lower than or at most equal to 1:1. Molar ratios between 1:200 and 1:4 in the liquid phase are usually preferred.

When the higher alpha-olefin is butene-1, the ratio between ethylene and butene in the liquid phase must be lower than or at most equal to 1:20, corresponding to a molar ratio between ethylene and butene-1 in the gaseous phase lower than or at most equal to 1:1.5 under normal conditions, in order to produce copolymers which are amorphous and vulcanizable to satisfactory rubbers. Molar ratios, in the liquid phase, between 1:1,000 and 1:20 are usually preferred.

By operating under these conditions, amorphous terpolymers containing less than about 75% by mols of ethylene are obtained. If these values are exceeded the terpolymer shows a crystallinity of polyethylenic type when subjected to X-ray examination.

The lower limit of the ethylene content is not critical; it is however preferable that the terpolymers contain at least 5% by mols of ethylene.

The alpha-olefin content of the copolymers can preferably vary from a minimum of 5% by mols to a maximum of 95% by mols.

The diene or polyene content of the terpolymer is preferably between 0.1 and 20%. This upper limit can be raised but, more particularly for economical reasons, it is not convenient to introduce into the terpolymer a diene or polyene content higher than 20% by mols.

If amorphous binary copolymers of ethylene and alkenylmethylencycloalkanes and/or -cycloalkenes, are desired, the diene or polyene content must be higher than 25% by mols.

The following examples illustrate the invention without limiting its scope.

EXAMPLE 1

25 cc. of anhydrous n-heptane and 3 cc. of 3-vinyl-6-methylen-1,2,3,4,5,6,7,8-octahydronaphthalene are introduced into a 100 cc. three-necked flask, provided with stirrer, inlet and outlet pipes for the gases and kept at the constant temperature of —20° C. Through the inlet pipe, reaching the reaction mass, a gaseous ethylene-propylene mixture in the molar ratio of 1:2 is introduced with a rate of 150 N l./h. The catalyst is preformed in a 100 cc. flask by working at —20° C. under nitrogen and reacting 0.5 millimols of vanadium tetrachloride and 1.25 millimols of aluminum triisobutyl in 25 cc. of anhydrous n-heptane. The catalyst thus preformed is siphoned into the reactor by means of nitrogen pressure. Feeding and discharging of the mixture is continued at the rate of 200 N l./h.

After 10 minutes from the beginning the reaction is stopped by adding 20 cc. of methanol containing 0.1 g. of phenyl-beta-naphthylamine. The polymer is purified in a separating funnel under nitrogen by repeated treatments with aqueous hydrochloric acid and then with water, and is coagulated with acetone.

After drying under vacuum there is obtained 0.85 g. of a solid product which is amorphous on X-ray examination, looks like an unvulcanized elastomer and is completely soluble in boiling n-heptane.

The infrared spectrographic examination shows the presence of $=CH_2$ groups (band at 11.45 microns). The ethylene/propylene molar ratio is about 1:1.

100 parts by weight of this unsaturated ethylene-propylene - 3-vinyl-6-methylen-1,2,3,4,5,6,7,8-octahydronaphthalene terpolymer are mixed on a laboratory roll mixer with 1 part of phenyl-beta-naphthylamine, 50 parts of carbon black HAF, 2 parts of sulphur, 5 parts of zinc oxide, 1 part of tetramethylthiouram disulphide and 0.5 part of mercaptobenzothiazole. The mixture thus obtained is vulcanized in a press for 60 minutes at 150° C. A vulcanized lamina having the following characteristics is obtained.

Tensile strength _____ kg./cm.$^2$ __ 126
Elongation at break _____ percent __ 420
Modulus at 300% _____ kg./cm.$^2$ __ 109

EXAMPLE 2

Into reaction apparatus as described in Example 1 and kept at the constant temperature of —20° C., there are introduced 25 cc. of anhydrous n-heptane and 2 cc. of 3-vinyl-6-methylene-1,2,3,4,5,6,7,8-octahydronaphthalene.

Through the gas inlet tube, a gaseous ethylene-propylene mixture in the molar ratio of 1:2 is introduced and circulated at the rate of 150 N l./h.

The catalyst is preformed at —20° C. in a 10 cc. flask by reacting 0.5 millimol of vanadium tetrachloride and 2.5 millimols of aluminum diethylmonochloride in 25 cc. of anhydrous n-heptane.

The catalyst thus preformed is siphoned into the reactor by means of nitrogen pressure. The propylene-ethylene mixture is continuously fed and discharged at the rate of 200 N l./h.

After 15 minutes the reaction is stopped by adding 20 cc. of methanol containing 0.1 g. of phenyl-beta-naphthylamine. The product is purified and isolated as described in Example 1. After vacuum drying, 5.7 g. of a solid product which is amorphous on X-ray examination, looks like a non-vulcanized elastomer and is completely soluble in boiling n-heptane are obtained.

The infrared spectrographic examination shows the presence of $=CH_2$ groups (band at 11.45 microns). The ethylene/propylene molar ratio is about 1:1.

The vulcanization of this ethylene/propylene/3-vinyl-6-methylen-1,2,3,4,5,6,7,8-octahydronaphthalene terpolymer is carried out using the same mix and the same modalities as described in Example 1.

A vulcanized lamina is obtained having the following characteristics:

Tensile strength _____kg./cm.$^2$__ 133
Elongation at break _____percent__ 480
Modulus at 300% _____kg./cm.$^2$__ 78
Permanent set at break _____percent__ 10

EXAMPLE 3

In apparatus as described in Example 1, and kept at the constant temperature of $-20°$ C., are introduced 25 cc. of anhydrous n-heptane and 2 cc. of 1-vinyl-2-methylencyclopentane.

The catalyst is preformed in a 100 cc. flask by working at $-20°$ C. and reacting 0.5 millimol of vanadium oxytrichloride and 2.5 millimols of aluminum diethylmonochloride in 25 cc. of anhydrous n-heptane. The catalyst thus preformed is siphoned into the reactor by means of a nitrogen pressure.

The mixture is continuously fed and discharged at a rate of 200 N l./h. After 15 minutes the reaction is stopped by adding 20 cc. of methanol containing 0.1 g. of phenyl-beta-naphthylamine. The product is purified and separated as described in Example 1. After drying under vacuum, 6.8 g. of a solid product which is amorphous on X-ray examination, completely soluble in boiling n-heptane, and which looks like a non-vulcanized elastomer, are obtained.

The examination by infrared spectrography shows the presence of $=CH_2$ groups (band at 11.45 microns).

The ethylene/propylene molar ratio is about 1:1. The vulcanization of this ethylene/propylene/vinylmethylencyclopentane terpolymer is carried out using the same mix and the same modalities as described in Example 1. The vulcanized lamina obtained has the following characteristics:

Tensile strength _____kg./cm.$^2$__ 147
Elongation at break _____percent__ 460
Modulus at 300% _____kg./cm.$^2$__ 97
Permanent set at break _____percent__ 18

EXAMPLE 4

Into reaction apparatus as described in Example 1 and kept at the constant temperature of $-10°$ C., there are introduced 25 cc. of anhydrous n-heptane and 3 cc. of 3-vinyl-6-methylen-1,2,3,4,5,6,7,8-octahydronaphthalene. An ethylene-butene-1 mixture in the molar ratio 1:3 is introduced through the gas inlet tube and circulated at a rate of 200 N l./h.

In a 100 cc. flask, the catalyst is preformed at $-10°$ C. under nitrogen, by reacting 0.5 millimol of vanadium tetrachloride and 2.5 millimols of diethylaluminummonochloride in 30 cc. of anhydrous n-heptane.

The catalyst thus preformed is siphoned into the reactor by means of nitrogen pressure. The gaseous mixture is continuously fed and discharged at a rate of 200 N l./h.

After 20 minutes the reaction is interrupted by adding 10 cc. of methanol containing 0.1 g. of phenyl-beta-naphthylamine. The product is purified and separated as described in Example 1. After drying under vacuum there are obtained 7.5 g. of solid product which is amorphous on X-ray examination, looks like a non-vulcanized elastomer and is completely soluble in boiling n-heptane. The infared spectrographic examination shows the presence of groups $CH_2=$(band at 11.45 microns) of ethyl groups (band at 13 microns) and of methylenic sequences of different lengths (zone between 13 and 14 microns).

The vulcanization is carried out using the same mix and the same modalities as in Example 1. A vulcanized lamina having the following characteristics is obtained:

Tensile strength _____kg./cm.$^2$__ 147
Elongation at break _____percent__ 460
Modulus at 300% _____kg./cm.$^2$__ 123

EXAMPLE 5

Into reaction apparatus as described in Example 1 and kept at the constant temperature of $-200$ C., there are introduced 25 cc. of n-heptane and 2 cc. of 3-vinyl-6-methylen-1,2,3,4,5,6,7,8-octahydronaphthalene. An ethylene-propylene mixture in the molar ratio of 1:2 is introduced through the gas inlet tube and circulated at a rate of 150 N l./h. The catalyst is preformed by reacting 0.5 millimol of vanadium tetrachloride and 1.25 millimols of beryllium diethyl in 25 cc. of anhydrous n-heptane at $-20°$ C., and is siphoned into the reactor by means of nitrogen pressure. The gaseous mixture is continuously fed and discharged at a rate of 200 N l./h.

15 minutes after starting of the reaction it is stopped by adding 20 cc. of methanol containing 0.1 g. of phenyl-beta-naphthylamine. The product is purified and separated as described in Example 1.

After drying under vacuum, there are obtained 7.7 g. of a solid product which is amorphous under X-ray examination, completely soluble in boiling n-heptane, and looks like a non-vulcanized ealstomer. The infrared spectographic examination shows the presence of $CH_2=$groups (band at 11.45 microns).

The ethylene/propylene molar ratio in this terpolymer is about 1:1. Vulcanization of the ethylene-propylene-3-vinyl-6-methylen - 1,2,3,4,5,6,7,8 - octahydronaphthalene terpolymer is carried out using the same mix and the modalities as described in Example 1. The vulcanized lamina has the following characteristics:

Tensile strength _____kg./cm.$^2$__ 143
Elongation at break _____percent__ 470
Modulus at 300% _____kg./cm.$^2$__ 75

EXAMPLE 6

Into reaction apparatus as described in Example 1 and kept at the constant temperature of $-20°$ C., there are introduced 25 cc. of anhydrous n-heptane and 5 cc. of 3 - vinyl - 6 - methylen-1,2,3,4,5,6,7,8-octahydronaphthalene.

An ethylene-propylene mixture in the molar ratio of 1:3 is introduced through the gas inlet tube and circulated at a rate of 200 N l./h.

The catalyst is preformed in a 100 cc. flask by reacting 0.5 millimol of vanadium oxytrichloride and 2.5 millimols of aluminum diethylmonochloride in 25 cc. of anhydrous n-heptane, and is siphoned into the reactor by means of nitrogen pressure. The gaseous ethylene-propylene mixture is continuously fed and discharged at a rate of 200 N l./h.

9 minutes after starting of the reaction it is stopped by adding 10 cc. of methanol containing 0.1 g. of phenyl-beta-naphthylamine. The crude terpolymerizate is purified and separated as described in Example 1, there being obtained, after drying under vacuum, 2 g. of a solid terpolymer which is amorphous on X-ray examination, looks like a non-vulcanized elastomer, and is completely soluble in boiling n-heptane.

The infrared spectrographic examination shows the presence of $CH_2=$ groups (band at 11.45 microns). The ethylene-propylene molar ratio in this terpolymer is about 1:1. The terpolymer is vulcanized using the same mix and the same modalities as in Example 1, to obtain a vulcanized lamina having the following characteristics:

Tensile strength _____ kg./cm.² __ 168
Elongation at break _____ percent __ 480
Modulus at 200% _____ kg./cm.² __ 67
Modulus at 300% _____ kg./cm.² __ 106

EXAMPLE 7

Reaction apparatus as described in Example 1, is used and kept at the constant temperature of −20° C. 25 cc. of anhydrous n-heptane and 3 cc. of 3-vinyl-6-methylen-1,2,3,4,5,6,7,8-octahydronaphthalene are placed in the apparatus.

An ethylene-propylene mixture in the molar ratio of 1:2 is introduced through the gas inlet tube and circulated at a rate of 150 N l./h.

The catalyst is preformed by reacting 0.5 millimol of vanadium tetrachloride and 2.5 millimols of ethylaluminumsesquichloride consisting of 1.25 millimols of monoethylaluminumdichloride and 1.25 millimols of aluminumdiethylmonochloride in 12.5 cc. of anhydrous n-heptane, in a 100 cc. flask, and is siphoned into the reactor by means of a nitrogen pressure. The ethylene-propylene-mixture is continuously fed and discharged at a rate of 150 N l./h.

14 minutes after starting of the reaction it is stopped by adding 10 cc. of methanol containing 0.1 g. of phenyl-beta-naphthylamine. The terpolymerizate is purified and separated as described in Example 1. It is a solid product weighing 3.1 g. and characterized in that it is amorphous on X-ray examination, looks like a non-vulcanized elastomer, and is completely soluble in boiling n-heptane.

The infrared spectrographic examination shows the presence of $CH_2=$ groups (band at 11.45 microns). The ethylene-propylene molar ratio is about 1:1. The terpolymer is vulcanized as described in Example 1, to thus obtain a vulcanized lamina having the following characteristics:

Tensile strength _____ kg./cm.² __ 240
Elongation at break _____ percent __ 580
Modulus 200% _____ kg./cm.² __ 97
Modulus at 300% _____ kg./cm.² __ 130
Permanent set at break _____ percent __ 7

EXAMPLE 8

Into reaction apparatus as described in Example 1 and kept at the constant temperature of −10° C. 25 cc. of anhydrous n-heptane and 3 cc. of 3-vinyl-5-methylene-1,2,3,4,5,6,7,8 - octahydronaphthalene are introduced. Through the gas inlet tube an ethylene-propylene-butene-1 gaseous mixture in the molar ratio of 1:2:2 is introduced and circulated at the rate of 200 N l./h.

The catalyst is preformed in a 100 cc. flask by reacting 0.5 millimol of vanadium tetrachloride and 2.5 millimols of aluminum diethylmonochloride in 30 cc. of anhydrous n-heptane at −10° C. and under nitrogen. The preformed catalyst is then siphoned into the reactor by means of nitrogen pressure. The gaseous monomer mixture is continuously fed and discharged at the rate of 200 N l./h.

After 20 minutes the reaction is stopped by adding 10 cc. of methanol containing 0.1 g. of phenyl-beta-naphthylamine. The terpolymerizate is purified and isolated as described in Example 1. After vacuum drying there are obtained 5.3 g. of a solid terpolymer which is amorphous on X-ray examination, looks like a non-vulcanized elastomer and is completely soluble in boiling n-heptane.

The infrared spectrographic examination shows the presence of $CH_2=$ groups (band at 11.45 microns), of methyl groups (band at 7.25 microns), of ethyl groups (band at 13 microns) in an amount which is about half the amount of the methyl groups, and of methylenic sequences of various length (zone between 13 and 14 microns).

The terpolymer is vulcanized using a mix and the conditions of Example 1, thereby obtaining a vulcanized lamina having the following characteristics:

Tensile strength _____ kg./cm.² __ 160
Elongation at break _____ percent __ 430
Modulus at 300% _____ kg./cm.² __ 118

It will be apparent that variations in details may be made in practicing our invention without departing from its scope. We intend to include in the scope of the appended claims all such variations and modifications as will be obvious to those skilled in the art from the description and working examples given herein.

What we claim is:

1. Substantially linear, amorphous, high molecular weight unsaturated copolymers of at least one monomer selected from the group consisting of 3-vinyl-6-methylen-1,2,3,4,5,6,7,8-octahydronaphthalene
1-vinyl-3-methylencyclopentane
vinylmethylencyclohexanes
allylmethylencyclo-octenes
methallyl-methylencycloheptenes
allylmethylendicyclo [2,2,1]-heptanes
methallylmethylendicyclo [2,2,1] heptenes with at least one monoolefin selected from the group consisting of ethylene and aliphatic alpha-olefins having the formula $CH_2=CH-R$, in which R is an alkyl radical containing from 1 to 6 carbon atoms, said copolymers consisting of unsaturated macromoles each of which is made up of units of each of the starting monomers, said copolymers containing from 5% to about 75% by mols of ethylene, from 0.1% to 20% by mols of the polyene, and the balance, if any, being aliphatic alpha-olefin.

2. The copolymers of claim 1, sulfur-vulcanized to elastomeric materials.

3. Copolymers according to claim 1, characterized in consisting of unsaturated macromolecules each of which is made up of units of ethylene, units of an aliphatic alpha-olefin, and units of 3-vinyl-6-methylen-1,2,3,4,5,6,7,8-octahydronaphthalene.

4. Copolymers according to claim 1, characterized in consisting of unsaturated macromolecules each of which is made up of units of ethylene, units of propylene, and units of 3-vinyl-6-methylen-1,2,3,4,5,6,7,8-octahydronaphthalene.

5. Copolymers according to claim 1, characterized in consisting of unsaturated macromolecules each of which is made up of units of ethylene, units of butene-1, and units of 3-vinyl-6-methylen-1,2,3,4,5,6,7,8-octahydronaphthalene.

6. Copolymers according to claim 1, characterized in consisting of unsaturated macromolecules each of which is made up of units of ethylene, units of an aliphatic alpha-olefin, and units of 1-vinyl-2-methylencyclopentane.

7. Copolymers according to claim 1, characterized in consisting of unsaturated macromolecules each of which is made up of units of ethylene, units of propylene, and consisting of unsaturated macromolecules each of which is made up of units of ethylene, units of butene-1, and units of 1-vinyl-2-methylencyclopentane.

8. Copolymers according to claim 1, characterized in units of 1-vinyl-2-methylencyclopentane.

References Cited

UNITED STATES PATENTS 3,313,786  4/1967  Kahle _____ 260—79.5

ROGER S. BENJAMIN, *Assistant Examiner.*

JOSEPH L. SCHOFER, *Primary Examiner.*

U.S. Cl. X.R.

260—80.7, 80.78, 82.1, 88.2

UNITED STATES PATENT OFFICE
CERTIFICATE OF CORRECTION

Patent No. 3,453,247                          July 1, 1969

Guido Sartori et al.

It is certified that error appears in the above identified patent and that said Letters Patent are hereby corrected as shown below:

Column 6, line 70, "10 cc." should read -- 100 cc. --. Column 8, line 17, "-200° C." should read -- -20° C. --. Column 10, line 56, beginning with "7. Copolymers" cancel all to and including "1-vinyl-2-methylencyclopentane." in line 63, and insert the following:

7. Copolymers according to claim 1, characterized in consisting of unsaturated macromolecules each of which is made up of units of ethylene, units of propylene, and units of 1-vinyl-2-methylencyclopentane.

8. Copolymers according to claim 1, characterized in consisting of unsaturated macromolecules each of which is made up of units of ethylene, units of butene-1, and units of 1-vinyl-2-methylencyclopentane.

Signed and sealed this 21st day of April 1970.

(SEAL)
Attest:

EDWARD M. FLETCHER, JR.                WILLIAM E. SCHUYLER, JR.
Attesting Officer                           Commissioner of Patents